Sept. 5, 1961            N. L. ETTEN            2,998,956
TOGGLE SHUT-OFF ASSEMBLY FOR FLUID LINES
Filed Aug. 27, 1958            2 Sheets-Sheet 1
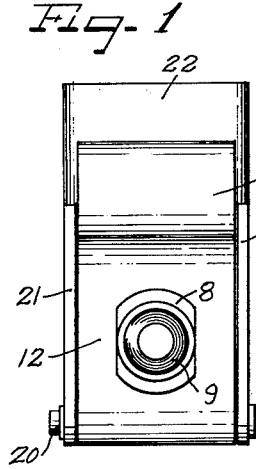
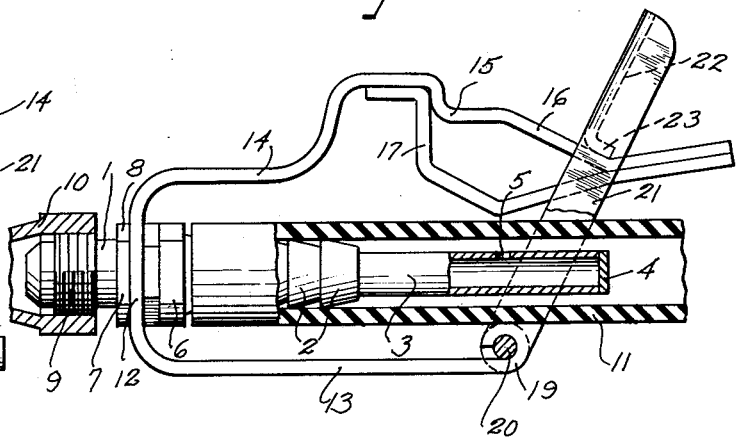
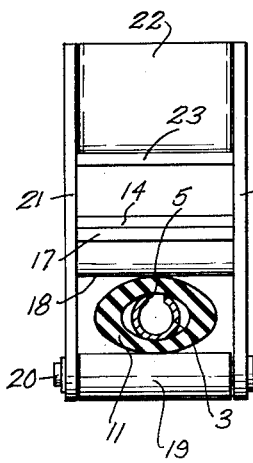
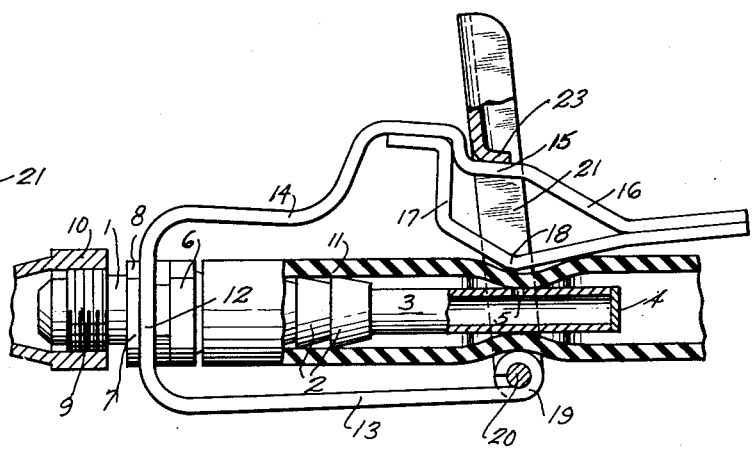
Inventor
Nicholas L. Etten
by Hill, Sherman, Meroni, Gross & Simpson Attys Sept. 5, 1961 N. L. ETTEN 2,998,956
TOGGLE SHUT-OFF ASSEMBLY FOR FLUID LINES
Filed Aug. 27, 1958 2 Sheets-Sheet 2
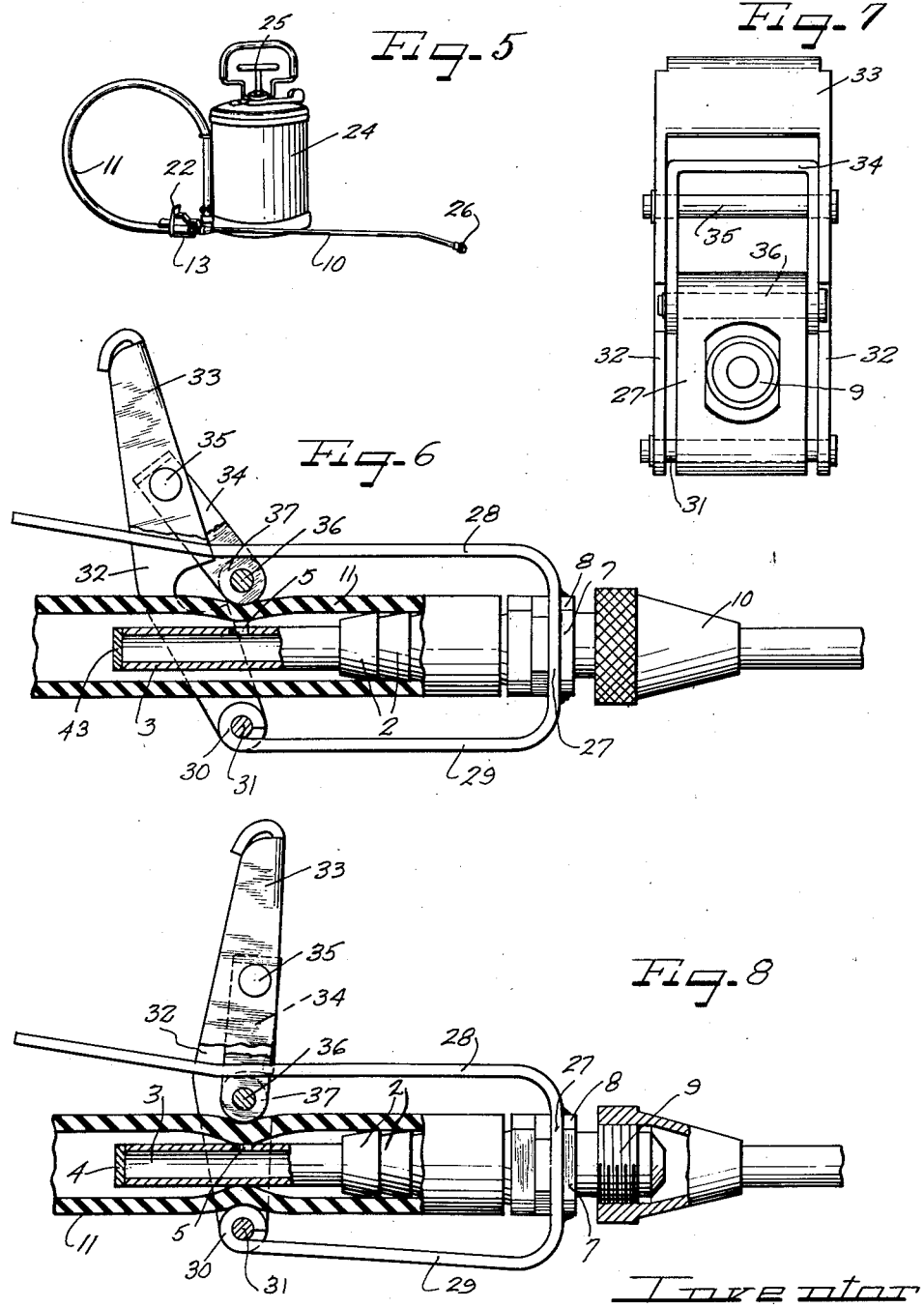
Inventor
Nicholas L. Etten United States Patent Office
2,998,956
Patented Sept. 5, 1961

2,998,956
TOGGLE SHUT-OFF ASSEMBLY FOR FLUID LINES
Nicholas L. Etten, Cedar Falls, Iowa
Filed Aug. 27, 1958, Ser. No. 757,529
5 Claims. (Cl. 251—10)

This invention relates to improvements in a toggle shut-off assembly for fluid lines, and more particularly to simple toggle mechanism for controlling the flow of fluid under pressure through a hose or the like, the invention being highly desirable for use in connection with plant and crop spraying and dusting equipment, although the mechanism will have numerous other uses and purposes as will be apparent to one skilled in the art.

In the past, crop sprayers and dusters, particularly those where the jet or spray was controlled by hand, were equipped with a flexible hose connected to a pressure tank and also to a rigid, straight or curved extension on the outer end of which was a nozzle. The extension was equipped with hand-actuated valve means, and it was necessary for the operator to hold a lever under compression with his hand during the entire spraying operation. If the control lever was released, the spray was automatically shut off. Such apparatus resulted in fatigue to the operator, especially where long spraying operations were necessary, and particularly so where the operator not only had to maintain the spray valve open, but also reach to a desired height to properly direct the spray. Hand fatigue of this type was also increased with sprayers of the type wherein the operator also carries the tank about with him while spraying.

With the foregoing in mind, it is an important object of the instant invention to provide a simple toggle shut-off assembly for controlling the flow of fluid under pressure through a hose or the like, which assembly remains in either the on or off position until again moved to the other position.

Another object of the invention is the provision of a simple toggle flow control assembly, highly desirable for use on the pressure lines from crop sprayers and the like, and which takes up no more room than the devices heretofore used on such mechanism, and which had to be physically held in open position.

Also a feature of this invention is the provision of a simple form of toggle flow control assembly, whereby the flow of fluid under pressure may be controlled by a simple flicking of a toggle link with the thumb or finger.

Another feature of this invention resides in the provision of a simple toggle mechanism for controlling the flow of fluid through a flexible hose, and which mechanism utilizes the hose itself as the valve means for shutting off flow.

A further feature of the invention resides in the provision of a simple form of toggle mechanism for controlling the flow of fluid under pressure through a hose, which toggle mechanism may readily be incorporated in the coupling member on the end of the hose, so as to be substantially an integral part thereof.

Still another object of the instant invention is the provision of flow control means for a fluid line, which means remain in the on and off position without holding until intentionally moved to the other position, and which are as economical to manufacture and install as means heretofore used for controlling fluid flow.

While some of the more salient features, characteristics and advantages of the instant invention have been above pointed out, others will become apparent from the following disclosures, taken in conjunction with the accompanying drawings, in which FIG. 1 is a front end view of a hose line equipped with means embodying principles of the instant invention;

FIG. 2 is a fragmentary part side elevational, part vertical sectional view of the structure of FIG. 1, indicating an extension or valve on the hose line;

FIG. 3 is a rear elevational view of the toggle mechanism, with the hose shown in section, showing the apparatus in shut-off position;

FIG. 4 is a part elevational and part vertical sectional view, of the character of FIG. 2, but showing the mechanism in shut-off position;

FIG. 5 is a reduced elevational view showing a compressed air sprayer equipped with a toggle shut-off assembly of the character seen in FIGS. 1 to 4 inclusive;

FIG. 6 is a part side elevation and part vertical sectional view, fragmentary, showing a toggle shut-off assembly embodying principles of the instant invention, but of a slightly different construction;

FIG. 7 is a front end elevational view of the structure of FIG. 6; and

FIG. 8 is a part side elevational, part vertical sectional fragmentary view of the character of FIG. 6, showing the toggle mechanism in shut-off position.

As shown on the drawings:

With reference now to FIGS. 1 to 4 inclusive of the drawings, it will be seen that the first illustrated embodiment of the instant invention includes a fitting which is preferably in the form of a coupling 1. This coupling is tubular, and is preferably made in a single piece, although it may be fabricated from several pieces, if so desired. The coupling includes hose holding means in the form of tapering flanges 2, and a tubular shank 3 extends rearwardly of the flanges 2. This shank 3 is closed at its inner end as indicated at 4 and is provided with an opening 5 in the side wall thereof, which forms the entrance port for fluid passing through the coupling. Forwardly of the flanges 2 the coupling is provided with a portion headed as at 6 to accommodate an open-ended wrench or similar tool, and on the leading part of this portion there is a part having straight side walls as at 7 connected by curvate ends 8. Forward of the headed structure, the coupling is provided with a threaded end portion 9 to which a nozzle or extension indicated at 10 may be connected.

A flexible hose 11 which may be of rubber, synthetic rubber, thermoplastic material or any other suitable substance is shown attached to the coupling by means of the tapered flanges 2. With reference to FIG. 2, it will be noted that the shank 3 on the coupling is of reduced diameter so that it extends freely inside the hose and in spaced relationship to the hose, allowing ample room for fluid to flow by the closed end of the shank and enter the coupling through the wall opening 5.

The flow control means includes a resilient U-shaped element having a yoke portion 12 thereof soldered, welded, or equivalently secured to that part of the coupling having the side formations 7 and the arcuate top and bottom shapes 8, the yoke 12 being provided with an aperture to intimately fit that part of the coupling, as seen in FIG. 1. The resilient element also includes an under arm 13 and an upper arm 14 extending rearwardly over the end of the hose and the shank 3 of the coupling, but in spaced relationship with the hose. The upper arm 14 is provided with a flat seat 15 thereon and a downwardly sloping portion 16 leading away from that seat. On the under side of the upper arm an additional piece 17 is secured which is shaped with an angular bend as at 18 to provide a pressure point opposite the aperture or opening 5 in the coupling shank.

The rear end of the under arm 13 is rolled into sleeve form 19 to accommodate a transverse pivot pin 20. Outside the ends of the sleeve 19 a toggle link comprising a pair of opposed legs 21—21 connected at the top with a finger or thumb contacting plate 22 is pivoted on the aforesaid pin 20. The actuating plate 22 has a rearwardly disposed flange 23 at the bottom thereof to ride the inclined portion 16 of the spring arm 14 and seat on the flat portion 15 of that arm.

From the foregoing description, it will be seen that all of the control mechanism is in effect integral with the coupling.

By way of example, and not by way of limitation, in FIG. 5 I have illustrated the above-described flow control apparatus associated with a compressed air sprayer. This sprayer comprises a pressure tank 24 which contains the medium to be sprayed, a pump 25 to provide the pressure, the aforesaid hose 11, the same coupling and toggle mechanism described above, with a rigid extension 10 on the outer end of the coupling, and a nozzle 26 on the end of the extension. It is a simple expedient for the operator of the sprayer to grasp the hose or extension near or over the arms 13 and 14, and with the apparatus as illustrated in FIGS. 4 and 5, the toggle link is moved forwardly, resting upon the seat 15, and thus contracting the arms 13 and 14 so that the ridge 18 compresses the hose 11 against the opening 5 in the shank 3 of the coupling, and seals that opening so there is a complete shut-off of fluid. When it is desired to spray, it is a simple expedient for the operator to flick the toggle rearwardly over the sloping portion 16 of the arm 14 with a finger or thumb, and the various parts immediately assume the position seen in FIG. 2 where there is a free flow of fluid through the coupling. That flow continues as long as there is sufficient pressure in the tank, or it may be stopped at any time by merely moving the toggle link forwardly on the seat 15. Thus, it will be seen that the toggle control may be maintained in either open or closed position, the operator's hand does not become fatigued from holding valve means open, and in operation a portion of the hose itself is utilized as the actual valve element for sealing off flow. The entire structure takes up no more room than control mechanisms heretofore utilized for the same purpose, and may be economically manufactured and used.

In FIGS. 6, 7 and 8, I have illustrated a slightly different form of structure which involves different toggle links. In this instance, the same coupling with the same hose as above described is also utilized.

In this instance, however, the resilient member embodies a yoke 27 secured to the coupling in advance of the hose in the manner above described, and from which upper and lower opposed arms 28 and 29 extend over the hose and over the coupling shank in spaced relationship to the hose. The lower of these arms is rolled to provide a sleeve 30 accommodating a transverse pivot pin 31. Pivoted to the ends of the pin 31 are the opposed legs 32—32 of a toggle link 33. A second U-shaped toggle link 34 is pivoted to the link 33 by a transverse pivot pin 35, and the legs of the link 34 are pivoted on a transverse pivot pin 36 extending through a sleeve 37, soldered, welded, or equivalently secured to the under side of the upper arm 28. As seen best in FIGS. 6 and 8, the sleeve 37 is disposed directly opposite the opening 5 in the shank of the coupling.

The arrangement described in connection with FIGS. 6, 7 and 8 provides the same ease of operation as the toggle mechanism previously described. As seen in FIG. 6, the mechanism is in partially open position, and will automatically assume fully open position by virtue of the tendency of the arms 28 and 29 to assume their original positions. In FIG. 8 the toggle mechanism is in closed position with the hose pressed against the shank to seal the opening 5 therein. The toggle linkage is of the over-center type, so that a plane passing through the center points of the pivot pins 31 and 35 will not include the center point of the pivot pin 36. In order to move the toggle linkage to open or flow position, it is simply necessary for the operator to move the toggle link 33 enough to clear the overcenter position, whereby the structure of FIGS. 6, 7 and 8 requires actually less movement on the part of the operator than the structure shown in FIGS. 1 to 4 inclusive. Otherwise, the same advantages prevail for both modifications of the invention.

It will be understood that modifications and variations may be effected without departing from the scope of the novel concepts of the present invention.

I claim as my invention:

1. In flow control means for a fluid line, a tubular coupling, a flexible hose having one end portion connected to said coupling, a shank on said coupling of less diameter than said hose extending freely inside said hose axially from the point of connection between the hose and coupling, said shank forming a conduit communicating with said tubular coupling and said shank having a closed end and an opening in the wall thereof, a member attached to said coupling and having a pair of resilient arms extending axially over opposite sides of said hose, and toggle means pivotally associated with said arms and arranged to selectively contract said arms and squeeze said hose against said shank and close the shank opening.

2. In a flow control coupling assembly for a flexible hose, a tubular coupling, holding means on said coupling, a shank of lesser diameter than said holding means extending axially therefrom, said shank forming a conduit communicating with the tubular coupling and having a closed end spaced axially from the coupling and a side opening in the wall thereof communicating with said conduit, a pair of spaced opposed resilient arms secured to said coupling and extending axially over opposite sides of said shank and a toggle linkage pivoted to at least one of said arms and movable to contract said arms to close the shank opening.

3. In a flow control coupling assembly for a flexible hose, a tubular coupling, holding means on said coupling, a shank of lesser diameter than said holding means extending axially from said coupling and forming a conduit therein in communication with the tubular coupling, said shank having a closed end spaced axially from the coupling and a side opening in communication with said conduit, a resilient U-shaped member having its yoke connected to said coupling outward of said holding means and its arms extending along opposite sides of said shank and spaced therefrom, and toggle means carried by said arms and operable for closing the shank opening.

4. In a flow control coupling assembly for a flexible hose, a tubular coupling, holding means on said coupling, a shank of lesser diameter than said holding means extending axially from said coupling and having a conduit therein in communication with the tubular coupling, said shank having a closed end spaced axially from the coupling and a side opening communicating with said conduit, a pair of opposed resilient arms connected to said coupling and extending along opposite sides of said shank in spaced relation thereto, one of said arms having a sloping portion, an inwardly extending member opposite said portion on the inner side of said one arm, a toggle link pivoted to the other of said arms, and means on said said toggle link to ride against said sloping portion and cause said member to move toward said shank for closing the shank opening.

5. In a flow control coupling assembly for flexible hose, a tubular coupling, holding means on said coupling, a shank of lesser diameter than said holding means extending axially therefrom and forming a conduit in communication with the tubular coupling, said shank having a closed end spaced axially from the coupling and a side opening communicating with said conduit, a pair of opposed resilient arms connected to said coupling and extending along opposite sides of said shank in spaced relation thereto, a toggle link pivoted to one of said arms, and a second link pivoted to the other of said arms and to the first said link outwardly of said other arm, said second link being movable to an over-center position by actuation of the first link for closing the shank opening.

(References on following page)

References Cited in the file of this patent

UNITED STATES PATENTS

| | | |
|---|---|---|
| 492,580 | Hadley | Feb. 28, 1893 |
| 1,217,433 | Frey | Feb. 27, 1917 |
| 1,883,960 | Koppel | Oct. 25, 1932 |
| 2,331,291 | Annin | Oct. 12, 1943 |
| 2,356,865 | Mason | Aug. 29, 1944 |

FOREIGN PATENTS

| | | |
|---|---|---|
| 497,762 | Germany | of 1928 |
| 626,257 | Germany | of 1936 |
| 202,475 | Switzerland | of 1939 |
| 432,785 | Italy | of 1948 |
| 1,017,265 | France | of 1952 |
| 791,490 | Great Britain | Mar. 5, 1958 |